US006304809B1

United States Patent
Cullen et al.

(10) Patent No.: US 6,304,809 B1
(45) Date of Patent: Oct. 16, 2001

(54) ENGINE CONTROL MONITOR FOR VEHICLE EQUIPPED WITH ENGINE AND TRANSMISSION

(75) Inventors: Michael John Cullen, Northville; Richard John Hippley, Canton, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/532,685

(22) Filed: Mar. 21, 2000

(51) Int. Cl.[7] .................................................. B60K 41/00
(52) U.S. Cl. .................................................. 701/93; 701/45
(58) Field of Search ................................. 701/45, 70, 93; 280/728.1, 734, 735; 180/170, 178, 282; 123/349, 350

(56) References Cited

U.S. PATENT DOCUMENTS

| | | | |
|---|---|---|---|
| 4,232,835 | * | 11/1980 | Berent .................................. 702/141 |
| 4,834,045 | | 5/1989 | Imai et al. . |
| 4,854,283 | | 8/1989 | Kiyono et al. . |
| 4,879,657 | | 11/1989 | Tamura et al. . |
| 4,962,835 | * | 10/1990 | Pruss .................................... 477/125 |
| 4,984,464 | * | 1/1991 | Thomas et al. ..................... 307/10.1 |
| 5,019,939 | | 5/1991 | Reimer . |
| 5,078,109 | | 1/1992 | Yoshida et al. . |
| 5,088,043 | | 2/1992 | Akishino et al. . |
| 5,096,015 | | 3/1992 | Akishino et al. . |
| 5,197,008 | * | 3/1993 | Itoh et al. .............................. 701/70 |
| 5,233,530 | | 8/1993 | Shimada et al. . |
| 5,303,797 | * | 4/1994 | Niikura ................................ 180/248 |
| 5,351,776 | | 10/1994 | Keller et al. . |
| 5,400,865 | | 3/1995 | Togai et al. . |
| 5,508,923 | * | 4/1996 | Ibamoto et al. ....................... 701/70 |
| 5,609,217 | * | 3/1997 | Honda et al. ........................ 180/170 |
| 5,625,588 | | 4/1997 | Togai et al. . |
| 5,673,668 | | 10/1997 | Pallett et al. . |
| 5,692,472 | | 12/1997 | Bederna et al. . |
| 5,737,224 | * | 4/1998 | Jeenicke et al. ....................... 701/45 |
| 5,752,211 | * | 5/1998 | Takasaki et al. ...................... 701/69 |
| 5,799,262 | | 8/1998 | Suzuki . |
| 5,999,875 | | 12/1999 | Bruedigam et al. . |
| 6,021,370 | * | 2/2000 | Bellinger et al. .................... 701/110 |

FOREIGN PATENT DOCUMENTS

| | | |
|---|---|---|
| 0429646 B1 | 4/1994 | (EP) . |
| 0441961 B1 | 5/1994 | (EP) . |

* cited by examiner

*Primary Examiner*—Michael J. Zanelli
*Assistant Examiner*—Eric M Gibson
(74) *Attorney, Agent, or Firm*—John D. Russell

(57) ABSTRACT

A method for monitoring an electronically controlled drive unit of a vehicle uses actual vehicle acceleration and a preselected vehicle acceleration. Actual acceleration is determined from any of an acceleration sensor or vehicle speed sensors. When actual acceleration is greater than the preselected acceleration, a reaction is initiated to reduce vehicle acceleration.

22 Claims, 6 Drawing Sheets

ENGINE CONTROL MONITOR FOR VEHICLE EQUIPPED WITH ENGINE AND TRANSMISSION

FIELD OF THE INVENTION

The field of the invention relates to monitoring of electronically controlled drive units in vehicles.

BACKGROUND OF THE INVENTION

In some engines, an electronically controlled throttle is used for improved performance. In addition, engines also may be controlled using engine output, or torque control where the actual engine torque is controlled to a desired engine torque through an output adjusting device, such as with the electronic throttle, ignition timing, air-fuel ratio, or various other devices.

One method to monitor engine control systems determines if actual engine torque is greater than desired engine torque. Actual engine torque is determined in accordance with engine airflow and/or injected fuel amount, and various other factors. Such a method is described U.S. Pat. No. 5,692,472.

The inventors herein have recognized a disadvantage of the above approach. In particular, when such a method is utilized with vehicles having multiple torque sources, such as hybrid electric vehicles, several different torque values can be considered. For example, torque produced by an electric motor and torque produced by an internal combustion engine can both contribute to overall drive torque. Thus, additional variables may be used to account for various torque sources. Each of these additional variables can then have redundancy. In the end, monitoring using the above structure may result in additional cost and/or complexity.

SUMMERY OF THE INVENTION

An object of the present invention is to provide a monitoring approach for use with vehicles having a single or multiple power sources.

The above object is achieved and disadvantages of prior approaches overcome by a method for monitoring and controlling a vehicle drive system, the method comprises determining a preselected vehicle acceleration, calculating an actual vehicle acceleration based on an accelerometer coupled to the vehicle, and initiating a reaction when said actual vehicle acceleration is greater than said preselected vehicle acceleration.

By utilizing the end result of vehicle acceleration, a simple structure is achieved that can be applied to various vehicle drive unit configurations. In addition, by using an accelerometer, monitoring can be performed at all vehicle speeds.

An advantage of the above aspect of the present invention is a potential for reduced system complexity and/or cost.

Another object of the present invention is to provide a mutually beneficial monitoring and control approach for use with vehicles having a single power source or multiple power sources.

In another aspect of the invention, the above object is achieved and disadvantages of prior approaches overcome by a system for a vehicle having an electronically controlled drive unit, the system comprising: a first controller that determines a desired acceleration based on an operator command and adjusts a drive unit operating parameter to achieve said desired acceleration; and a second controller that determines a preselected acceleration of the vehicle based on said desired acceleration, determines an actual vehicle acceleration based on a sensor coupled to the vehicle, and initiates a reaction when said actual vehicle acceleration is greater than said preselected acceleration.

By utilizing the end result of vehicle acceleration, a simple structure is achieved that can be applied to various vehicle drive unit configurations. Further, by structuring the vehicle control around desired acceleration, both the monitoring and control complement one another and a simple structure is achieved.

An advantage of the above aspect of the present invention is a potential for reduced system complexity and/or cost.

BRIEF DESCRIPTION OF THE DRAWINGS

The object and advantages of the invention claimed herein will be more readily understood by reading an example of an embodiment in which the invention is used to advantage with reference to the following drawings wherein:

DESCRIPTION OF THE INVENTION

Figure 1:
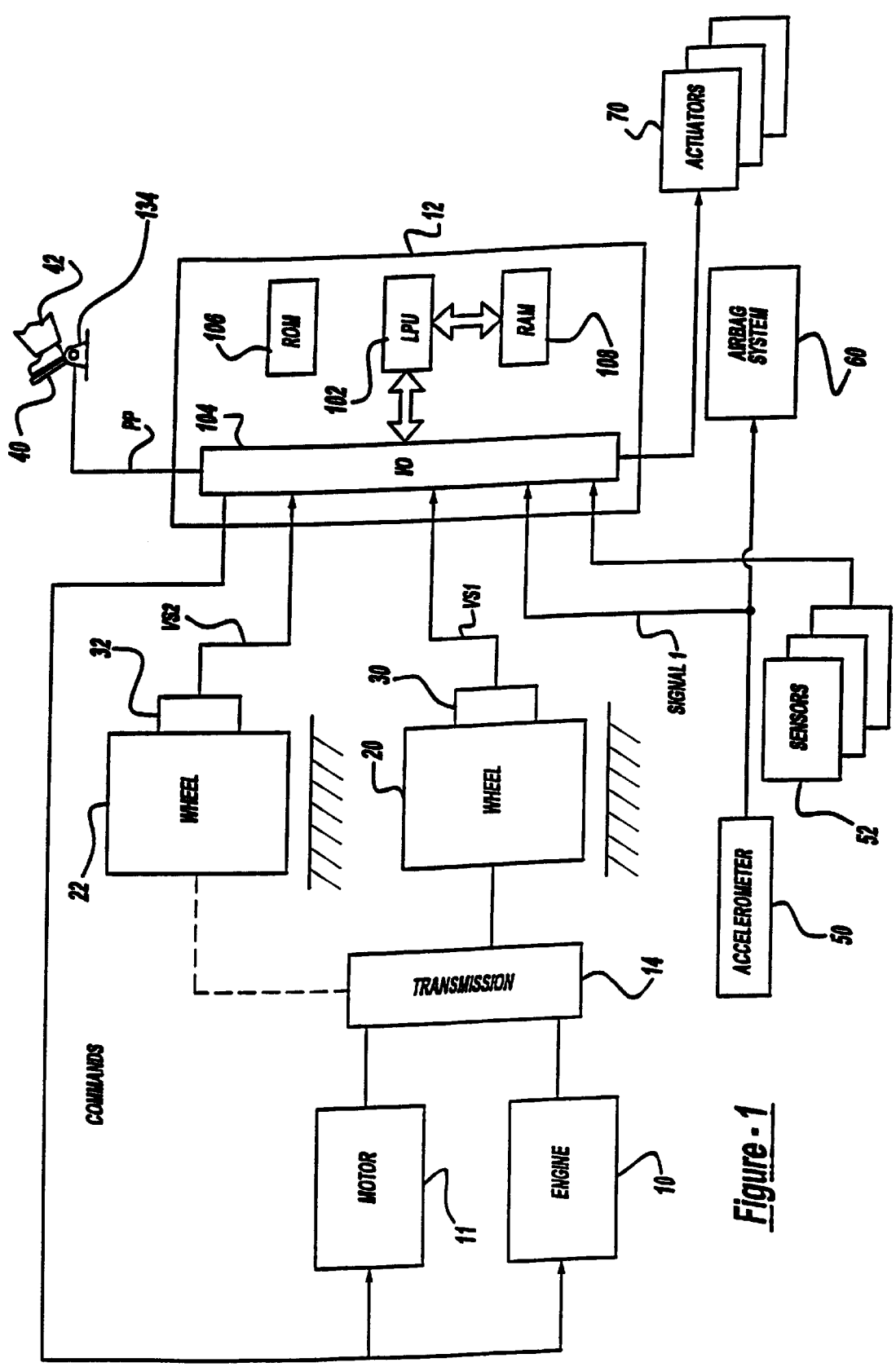
FIG. 1 is a block diagram of a vehicle illustrating various components related to the present invention.

Referring to FIG. 1, internal combustion engine 10 and motor 11 of a vehicle (not shown) are shown coupled to transmission 14. Engine 10 and motor 11 can be coupled in various ways known to those skilled in the art, such, for example, in a parallel fashion, a series fashion, or any combination thereof. Motor 11 can be an electric motor capable of supplying power to or receiving power from transmission 14. For example, motor 11 can be used to provide regenerative braking or to provide the vehicle tractive force from batteries (not shown) that store energy. Transmission 14 is coupled to a first set of drive wheels 20. In addition, to provide all wheel drive, transmission 14 can also be coupled to a second set of drive wheels 22. Transmission 14 can be a combined gear set and torque converter, a continuously variable transmission, or any other power transfer unit known to those skilled in the art and suggested by this disclosure.

Continuing with FIG. 1, accelerator pedal 40 is shown communicating with the driver's foot 42. Accelerator pedal position (PP) is measured by pedal position sensor 134 and sent to controller 12.

Controller 12 receives various signals from sensors coupled to engine 10, motor 11, and the vehicle, in addition to those signals previously discussed, including: first measurement of vehicle speed (VS1) of wheel 20 from sensor 30, second measurement of vehicle speed (VS2) of wheel 22 from sensor 32, measurement of vehicle acceleration (SIGNAL1) from accelerometer 50, and various other signals from sensors 52. These other signals include engine coolant temperature (ECT), and air charge temperature (ACT). Also, controller 12 sends signals to actuators 70.

Accelerometer 50 can also be coupled to airbag system 60. Thus, according to the present invention, a single sensor can be used for both an airbag system and a vehicle monitoring system. In addition, accelerometer 50 is capable of outputting a signal representative of vehicle acceleration at all vehicle speeds, including zero vehicle speed. In other words, determining vehicle acceleration from a vehicle speed sensor may provide degraded performance at low vehicle speeds. This is because the pickup, sometimes magnetic, which generates a signal when a certain point of the vehicle wheel rotates past the pickup. If the vehicle wheel is not rotating, no signal is produced and determinations of vehicle speed and/or vehicle acceleration are degraded. However, the accelerometer is capable of outputting a signal independent of vehicle speed, and thus the present invention can monitor even at low vehicle speeds.

In the embodiment described herein, controller 12 is a conventional microcomputer including: microprocessor unit 102, input/output ports 104, electronic memory chip 106, which is an electronically programmable memory in this particular example, random access memory 108, and a conventional data bus.

In the embodiment described herein, engine 10 is electronically controlled by an electronic throttle control system (not shown). In such a system, the drive unit, which in this case is engine 10, motor 11, and transmission 14, is controlled to produce a desired vehicle acceleration. Such an acceleration control system is described later herein with particular reference to FIGS. 4–6. Also, controller 12 provides a speed control function wherein vehicle speed is controlled to a desired speed set by the vehicle driver.

Figure 2:
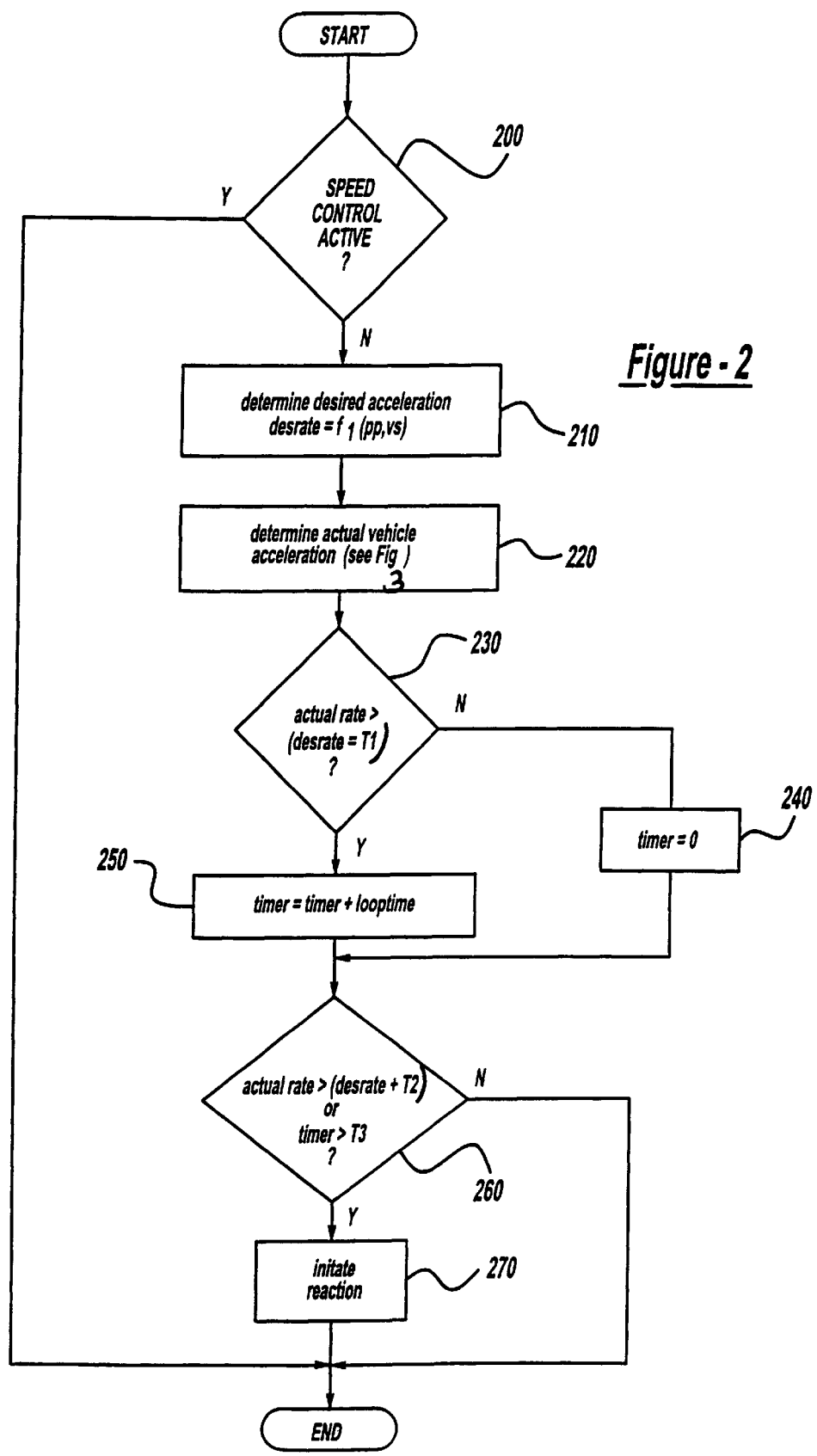
FIGS. 2–6 are block diagrams of embodiments in which the invention is used to advantage.

Referring now to FIG. 2, a routine is described for monitoring the electronically controlled drive units in the vehicle. First, in step 200, a determination is made as to whether speed control is active. When the answer to step 200 is NO, the routine continues to step 210. In step 210, desired acceleration (desrate, or acc_dd_req) is determined based in part on a function (f1) of pedal position (PP) and vehicle speed (VS1) as described later herein. In an alternative embodiment, desired acceleration (desrate, or acc_dd_req) can also be adjusted based on actuation of the brake pedal. In addition, in still another embodiment, desired acceleration (desrate, or acc_dd_req) can also be adjusted based on the position of a gear selector. For example, in automatic transmissions, the level that selects P,R,N,D,L,1 (park, reverse, neutral, drive, low, low 1, etc.) is taken into account in determining desired acceleration. In still another embodiment, desired acceleration can be modified depending on whether a switch is set to a "sport" mode or a "fuel economy" mode. Then, in step 220, actual vehicle acceleration (actualrate) is determined as described later herein with particular reference to FIG. 3.

Continuing with FIG. 2, in step 230, a determination is made as to whether actual acceleration (actualrate) is greater than the desired acceleration plus a first calibratable threshold (T1). When the answer to step 230 is NO, timer is reset to zero in step 240. Otherwise, timer is incremented by the computer loop time (looptime) in step 250. Next, in step 260, a determination is made as to whether actual acceleration (actualrate) is greater than the desired acceleration plus a second calibratable threshold (T2) or timer is greater than third calibratable threshold (T3). In one embodiment, threshold T2 is greater than threshold T1.

When the answer to step 260 is YES, a reaction is initiated in step 270. This reaction is in a preferable embodiment, decreasing engine torque. Engine torque can be decreased in a variety of methods, including decreasing fuel amount, decreasing air amount, retarding ignition timing, deactivating cylinders, or any other method known to those skilled in the art in view of this disclosure to reduce engine torque. Also, a reaction can be changing a transmission gear ratio to produce less wheel torque or engaging ancillary devices to consume engine torque. Further, a reaction may be to reduce motor torque or cause motor 11 to act as a generator, thereby absorbing energy and reducing wheel torque. Further still, a reaction may be to reduce vehicle acceleration by any method listed above herein.

Figure 3:
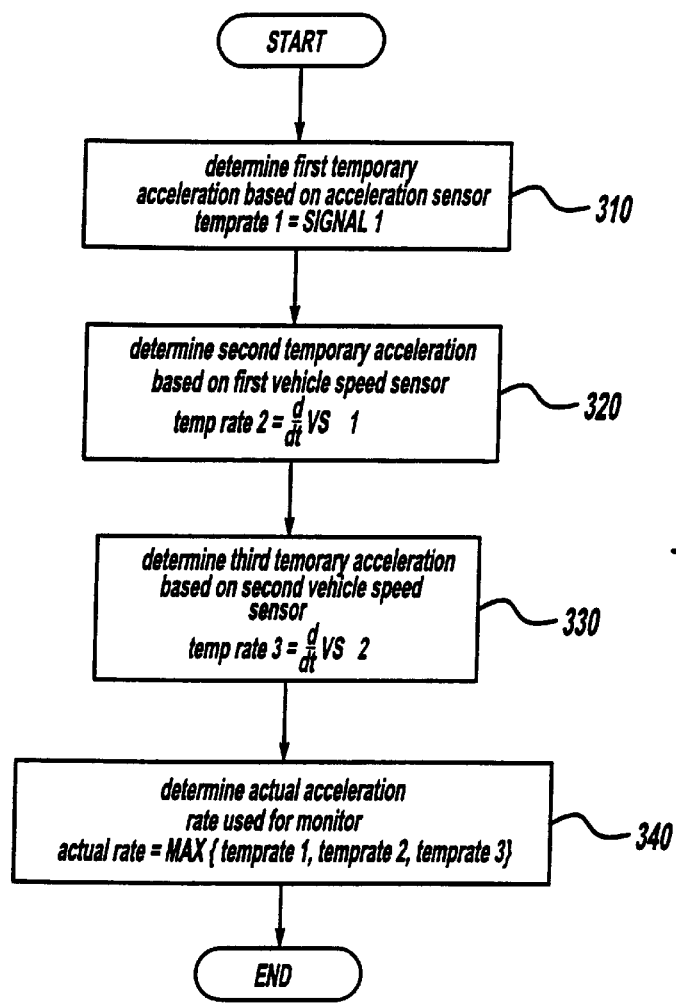

Referring now to FIG. 3, a routine is described for determining actual vehicle acceleration. First, in step 310, the routine determines a first temporary acceleration (temprate1) based on acceleration sensor 50. Then, in step 320, the routine determines a second temporary acceleration (temprate2) based on first vehicle speed signal (VS1). In particular, a derivative of vehicle speed is used. In one embodiment, a lead lag filter is used to approximate a derivative and also reduce noise. Then, in step 330, the routine determines a third temporary acceleration (temprate3) based on second vehicle speed signal (VS2). Again, a lead lag filter can be used to approximate a derivative and also reduce noise. Finally, in step 340, actual acceleration (actualrate) used for monitoring is determined based on a maximum of the first through third temporary accelerations.

In the above embodiment, all three acceleration measurements are used. In alternative embodiments, various combination of these can be used, such as, for example, the maximum of tempratel and temprate2. Also, a single measurement alone can be used.

Figure 4:
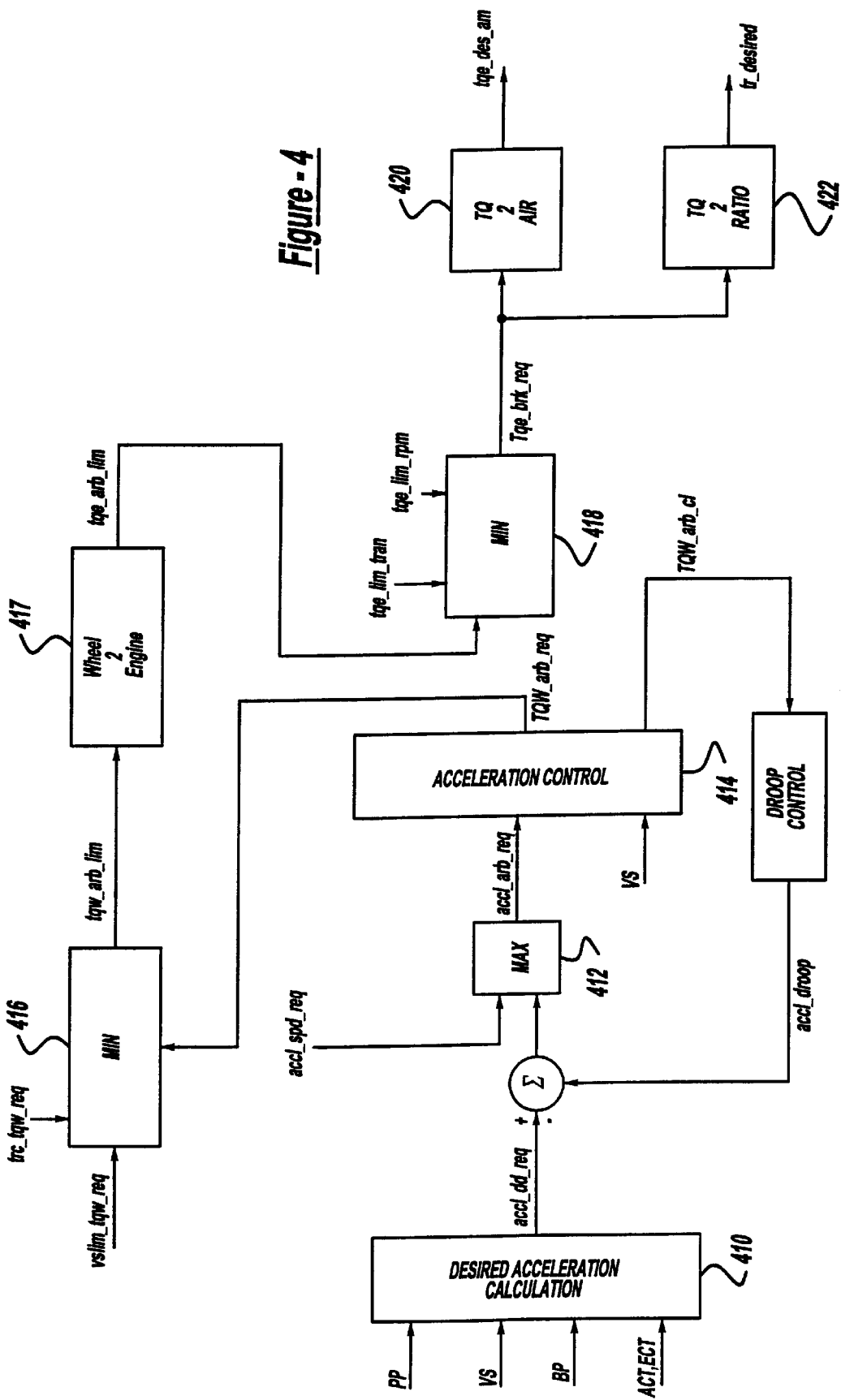

Referring now to FIG. 4, a control system is described for controlling the engine and electronic throttle. Desired acceleration from the driver, or driver demanded acceleration (acc_dd_req), is determined based on pedal position (PP) and vehicle speed (VS), with modifications for barometric pressure (BP) and engine and air temperatures (ECT, ACT) in block 410. Then, the difference between driver demanded acceleration and "droop" control output (accl_droop) is compared with desired acceleration from speed control (accl_spd_req). In particular, a maximum of these two values is determined as a arbitrated desired acceleration (accl_arb_req) from block 412. "Droop" control is described later herein with particular reference to FIG. 5. Also, desired acceleration from speed control (accl_spd_req) is determined based on a vehicle speed error between a set speed and an actual vehicle speed. In one embodiment, the vehicle speed error is used in conjunction with a non-linear gain function to produce (accl_spd_req). For example, when speed error is between first and second speed error limits, accl_spd_req is linearly related to speed error. The speed error limits may be, plus and minus 3 MPH, for example. Outside these speed error limits, desired acceleration may be limited to a fixed value, such as 1.5 MPH/sec, for example.

Figure 6:
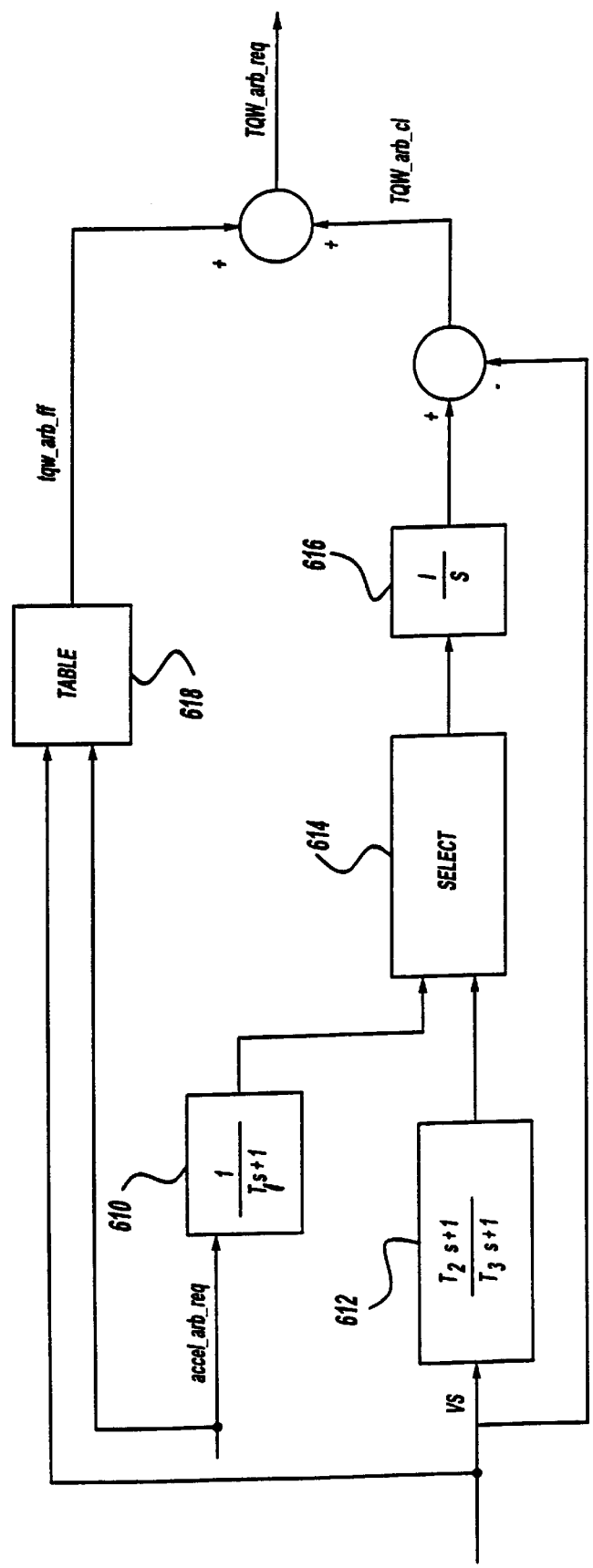

Then, this first arbitrated acceleration, accl_arb_req, and vehicle speed (VS) are used to control vehicle acceleration in block 414 as described with particular reference to FIG. 6. The output of the acceleration control is a desired wheel torque value (tqw_arb_req) and a closed loop control torque (tqw_arb_cl).

Continuing with FIG. 4, a desired wheel torque from traction control (trc_tqw_req), a desired wheel torque from vehicle speed limiting (vslim_tqw_req), and acceleration control desired wheel torque (tqw_arb_req) are compared in block 416. In particular, desired wheel torque from traction control is a desired wheel torque to prevent wheel slippage while desired wheel torque from vehicle speed limiting is a desired wheel torque to prevent vehicle speed (VS) from exceeding a limit value. The output of block 416 (tqw_arb_lim), which is the minimum of trc_tqw_req, vslim_tqw_req, and tqw_arb_req, is then converted to engine torque via the effective gear ratio (including torque converter multiplication) in block 417 to produce (tqe_arb_lim). Next, a maximum allowed torque acceptable from transmission 14 (tqe_lim_tran), a desired engine torque from engine speed limiting (tqe_lim_rpm), and tqe_arb_lim are fed to block 418. Further, tqw_arb_req (after being converted by effective gear ratio into engine torque) is fed to block 418. The output of block 418, the requested engine brake torque (tqe_brk_req), is the minimum of the inputs to block 418. This requested engine brake torque (tqe_brk_req) is then converted to a desired airflow (tqe_des_am) in block 420 and a desired torque ratio (tr_desired) in block 422. In particular, when the desired engine brake torque is less than the engine brake torque at closed throttle and normal operating conditions, a torque ratio is calculated by dividing desired engine torque by engine brake torque at closed throttle and normal operating conditions. Then, the desired airflow is used to control the electronic throttle using methods known to those skilled in the art in view of this disclosure.

Figure 5:
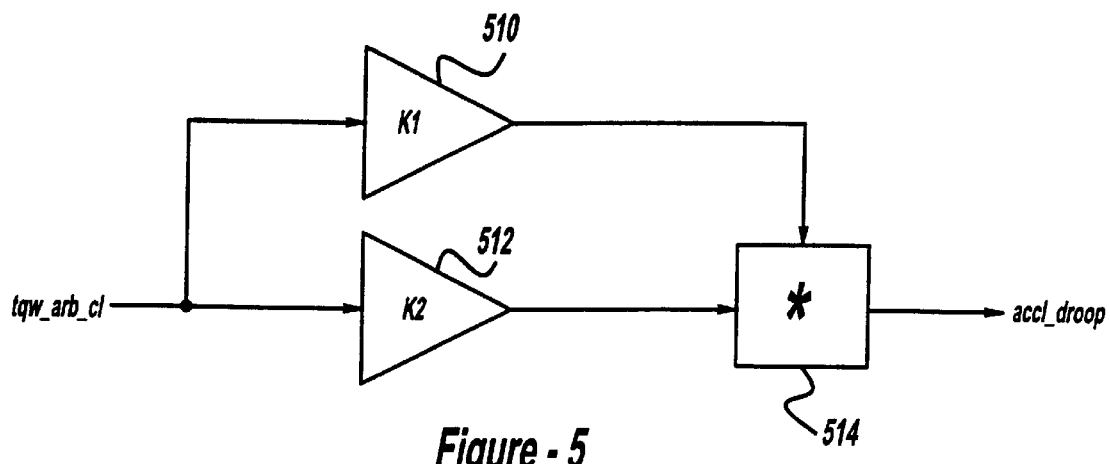

Referring now to FIG. 5, droop control is described. Closed loop control torque (tqw_arb_cl) is multiplied by first gain K1 in block 510 and by second gain K2 in block 512, where K2 represents vehicle mass and wheel diameter. In an alternative embodiment, gain K1 is a function of speed error and saturates outside a linear region. Also, this function can be different depending on the sign of the error to give expected drive feel both up and down hills. Then, the output of blocks 510 and 512 are multiplied in block 514. The output is accl_droop, whose use is described above herein.

Referring now acceleration control to FIG. 6, arbitrated desired acceleration (accl_arb_req) is fed to a low pass filter with first filter coefficient (t1) in block 610. Also, vehicle speed (VS) is fed to a filter representing an approximate derivative with second and third filter coefficients (t2,t3) in block 612. The output of blocks 610 and 612 are fed to select block 614. Select block 614 selects one of the two inputs. In particular, select block 614 prevents integrator wind up by providing zero error when integrator output reaches a preselected value, or when the desired acceleration is arbitrated out later on in the control system, such as, for example, based on some other control system. The output of block 614 is fed to block 616, which represents an integrator. The difference between the output of block 616 and vehicle speed (VS) represents closed loop control torque (tqw_arb_cl). This is then added to feedforward control torque (tqw_arb_ff) and produces tqw_arb_req. Feedforward control torque (tqw_arb_ff) is determined from a table based on arbitrated desired acceleration (accl_arb_req) and vehicle speed (VS) in block 618. In an alternative embodiment, this can be calculated based on vehicle mass, wheel diameter, and running losses.

Summarizing FIGS. 4–6, pedal position (PP) and vehicle speed (VS) are used to look-up a value of intended vehicle acceleration. The table is structured with pedal position (PP) in rows and vehicle speed (VS) in columns. It is calibrated, first, by placing an acceleration value of 0 at each intersection of pedal position and vehicle speed where steady state operation is desired. Increasingly positive values of acceleration would be added upward and decreasingly negative values downward for each column to obtain the desired throttle tip-in feel at that speed. A smoothing operation should be done across each row to assure smooth convergence onto the steady state speed under constant pedal position input. The output of this table is modified with multipliers for barometric pressure and operating temperature.

The resulting driver demand requested acceleration modified to simulate droop is arbitrated against an acceleration request from vehicle speed control. The arbitration is based on the maximum of the two requesters. If vehicle speed control is not active, a sufficiently large negative request is issued to prevent it from interfering with the driver demand. If vehicle speed control is active and the driver attempts to override the system with the pedal, this will be done once the pedal input produces an acceleration that exceeds that of the speed control. Vehicle speed control will automatically be limited to maximum positive and negative accelerations specified in the driver demand tables.

Acceleration control is responsible for converting desired acceleration into a wheel torque request and consists of the following sub-tasks:

A feed-forward term represents the driver demand or speed control response to acceleration input for nominal level road conditions. It operates by converting the requested acceleration and current vehicle speed into a wheel torque by using conversions based on vehicle mass and running loss coefficients, respectively. Because no integration or filtering is involved, the response to input is immediate.

A closed-loop term is calculated by first integrating desired acceleration into a target vehicle speed. The error between this target speed and actual vehicle speed multiplied by a gain and becomes the closed-loop term. Because the feed-forward term responds immediately with a level road response, any deviation between target and actual speeds is due to road and/or vehicle load variations. If the vehicle is operating under nominal mass and running losses on a level road, this term will be zero.

A simulated droop (droop control) is achieved by taking the closed-loop term and feeding it backward through the vehicle mass term used in the Feed-forward Term. This resulting droop acceleration term is then subtracted from the driver demanded value of desired acceleration before it feeds into the speed control arbitration scheme. This would essentially negate the action of the Closed-loop Term, so this droop acceleration term is multiplied by a calibration coefficient that specifies how much compensation is desired for specific conditions (K1). A value of 0 would indicate no droop and the system would provide full-time speed control under driver demand. A value of 1 would indicate full droop and the system would provide no closed loop compensation. In one embodiment, a value of 0 would be used for downhill conditions and approximately 0.5 for uphill. This would provide full compensation downhill while restricting the amount of droop on an uphill to half what it normally would be.

An advantage of the above structure is that a monitoring structure is provided that is applicable to many different drive unit configurations since the end result of vehicle acceleration is used. Further, since the arbitration between cruise control and driver demand uses acceleration, disadvantages of torque arbitration schemes are overcome. In particular, with prior art torque arbitration schemes, the maximum of driver demanded torque and cruise control torque was selected. However, if negative torque is needed to control vehicle speed during cruise operation, such as down a hill, such control is not available since zero torque is typically the minimum torque allowed when the driver is not actuating the pedal. Alternatively, If negative torques are used in the driver demand table, then tip-out performance, or foot off pedal performance, and coasting driveability are sacrificed on level roads. Driveability is sacrificed in level roads since the negative torque requests may cause downshifts on some tip-outs. Such transmission shifting can degrade drive feel on level roads. The prior art torque arbitration approach does not suggest how to resolve this conflict.

Figure 7:
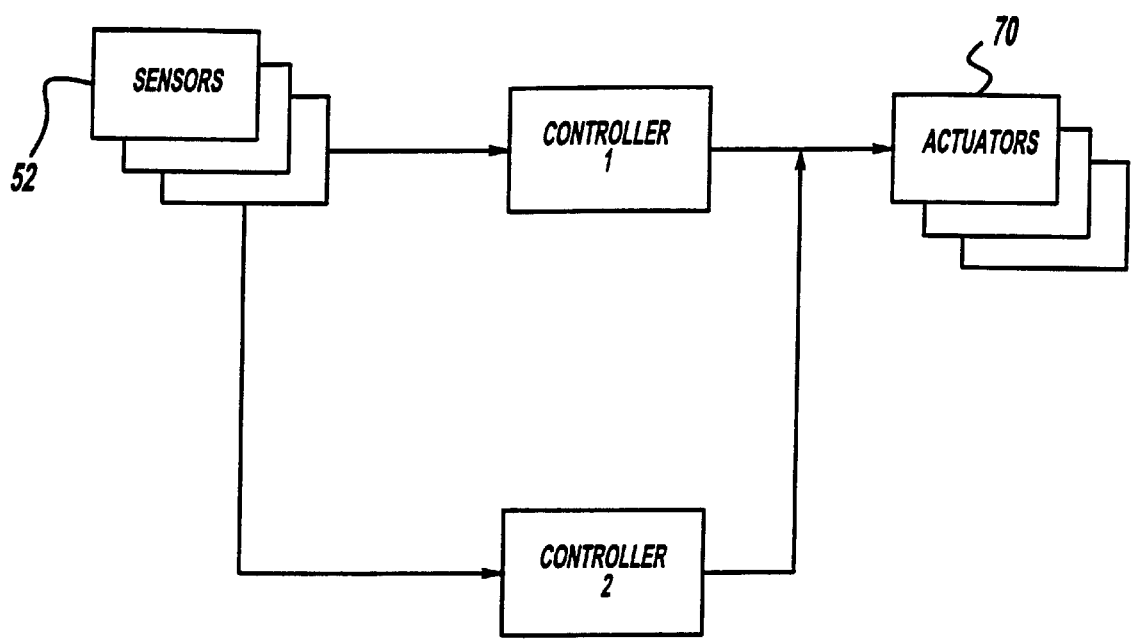
FIG. 7 is a block diagram illustrating an alternative embodiment of the present invention.

In the above described embodiment, acceleration control and monitoring are both within a single microprocessor 12. An alternative embodiment is described in FIG. 7, where acceleration control is conducted in controller 1 and acceleration monitoring is conducted in controller 2. In such an approach, the routines described in FIGS. 2–3 would be performed in controller 2 while the control described in FIGS. 4–6 would be performed in controller 1.

Although several examples of embodiments which practice the invention have been described herein, there are numerous other examples which could also be described. For example, the invention can also be used with hybrid electric vehicles using lean operating engines, or with any combination of motors and engines that combine into a drive unit. The invention is therefore to be defined only in accordance with the following claims.

What is claimed is:

1. A method for monitoring and controlling a vehicle drive system, the method comprising:
   determining a first reference vehicle acceleration based on a driver command;
   determining a second reference vehicle acceleration based on an automatic cruise control system;
   controlling the vehicle drive system based on one of said first reference vehicle acceleration and said second reference vehicle acceleration;
   calculating an actual vehicle acceleration based on a sensor coupled to the vehicle; and
   initiating a reaction when said actual vehicle acceleration is greater than said one of said first and second reference vehicle acceleration.

2. The method recited in claim 1 where said step of calculating an actual vehicle acceleration further comprises selecting a maximum of a first measured acceleration based on said sensor and a second measured acceleration based on a second sensor.

3. The method recited in claim 1 wherein said second sensor is a vehicle speed sensor.

4. The method recited in claim 1 wherein said sensor is an accelerometer, wherein said accelerometer is also used to activate an airbag.

5. A method for monitoring and controlling a vehicle drive system, the method comprising:
   determining a preselected vehicle acceleration based on one of a driver command and a cruise control command;
   calculating an actual vehicle acceleration based on an accelerometer coupled to the vehicle; and
   initiating a reaction when said actual vehicle acceleration is greater than said preselected vehicle acceleration.

6. The method recited in claim 5 wherein said accelerometer is capable of outputting a signal representative of vehicle acceleration at all vehicle speeds.

7. The method recited in claim 6 wherein said accelerometer is coupled to an airbag system.

8. The method recited in claim 5 wherein said step of initiating said reaction reduces vehicle acceleration.

9. The method recited in claim 5 wherein said step of initiating said reaction reduces engine output.

10. The method recited in claim 5 wherein said step of initiating said reaction reduces wheel torque.

11. The method recited in claim 5 where said step of calculating an actual vehicle acceleration further comprises selecting a maximum of a first measured acceleration based on said accelerometer and a second measured acceleration based on a second sensor.

12. The method recited in claim 11 wherein said second sensor is a vehicle speed sensor.

13. A system for a vehicle having an electronically controlled drive unit, the system comprising:
   a first controller that determines a desired acceleration based on an operator command and adjusts a drive unit operating parameter to achieve said desired acceleration;
   a second controller that determines a preselected acceleration of the vehicle, determines an actual vehicle acceleration based on a maximum of a first acceleration from a first sensor coupled to the vehicle and a second acceleration from a second sensor coupled to the vehicle, and initiates a reaction when said maximum vehicle acceleration is greater than said preselected acceleration.

14. The system recited in claim 13 further comprising a airbag module coupled to at least one of said first and second sensors.

15. The system recited in claim 13 wherein said drive unit comprises an engine.

16. The system recited in claim 13 wherein at least one of said first and second sensors is an accelerometer.

17. The system recited in claim 13 wherein said desired acceleration is based on one of a driver pedal command and a cruise control command.

18. A method for monitoring and controlling a vehicle drive system, the method comprising:
   determining a preselected vehicle acceleration based on a commanded acceleration;
   calculating a first vehicle acceleration based on an accelerometer coupled to an airbag system; and
   initiating a reaction by adjusting the vehicle drive system when said first vehicle acceleration is greater than said preselected vehicle acceleration.

19. The system recited in claim 18 wherein said accelerometer is capable of outputting a signal representative of vehicle acceleration at all vehicle speeds.

20. A system for use with a vehicle having a drive unit for propelling the vehicle, comprising:
   an airbag system;
   an accelerometer coupled to said airbag system; and
   a controller for calculating a vehicle acceleration based on said accelerometer, and adjusting an operating parameter of the drive unit based on said calculated vehicle acceleration.

21. The method recited in claim 20 wherein said adjusting said operating parameter further comprises adjusting a torque produced by the drive unit.

22. The method recited in claim 21 wherein said operating parameter is a fuel injection amount.

* * * * *